May 24, 1949.  A. O. GOLDSTEIN  2,470,813
SLICER FOR CITRUS FRUIT AND THE LIKE
Filed Oct. 7, 1947

INVENTOR.
Adolph. O. Goldstein
BY
McMorrow, Berman & Davidson
Attorneys

Patented May 24, 1949

2,470,813

UNITED STATES PATENT OFFICE 2,470,813

SLICER FOR CITRUS FRUIT AND THE LIKE

Adolph O. Goldstein, Santa Cruz, Calif.

Application October 7, 1947, Serial No. 778,291

2 Claims. (Cl. 146—72)

My invention relates to a slicer for citrus fruit, and the like.

An important object of the invention is to provide a device to facilitate the manual slicing of citrus fruit, and the like, such device being simplified in design and quite inexpensive to produce.

A further object is to provide a citrus fruit slicer which requires the use of only one of the hands of the user, and which is adapted to hold a desired quantity of fruit.

A still further object of the invention is to provide a citrus fruit slicer which is very simple to operate, and readily cleaned after use.

Other objects and advantages of the invention will be apparent during the course of the following description.

Figures 1, 2:
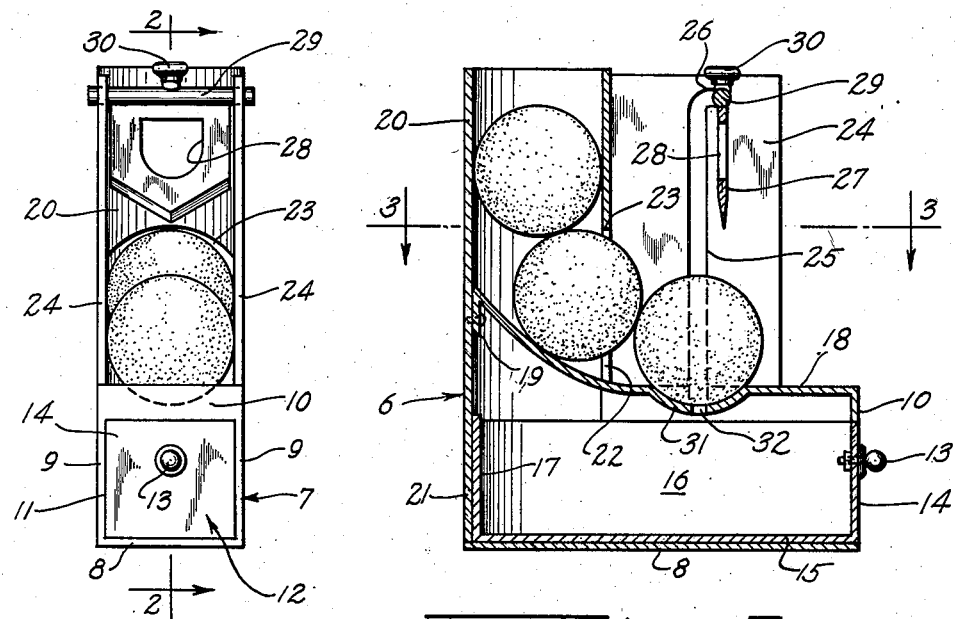
Figure 3:
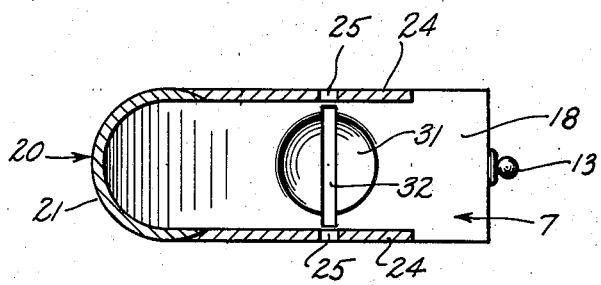

In the accompanying drawings, forming a part of this application, and in which like numerals are employed to designate like parts throughout the same, Figure 1 is an end elevation of the fruit slicer embodying the invention, Figure 2 is a central vertical section taken on line 2—2 of Figure 1, and Figure 3 is a horizontal section taken on line 3—3 of Figure 2.

In the drawings, where for the purpose of illustration is shown a preferred embodiment of the invention, the numeral 6 designates a body or casing, including a bottom elongated horizontal base portion or box 7. The box 7 is rectangular in transverse cross section, and includes a bottom 8, sides 9, and front end 10. The front end 10 has a rectangular opening 11 to permit the passage of a sliding pan or juice catch 12. The sliding pan is also rectangular in transverse cross section and elongated, and is slidably disposed within the box 7. The pan 12 has a handle or knob 13, rigidly secured to the front end 14 thereof. The pan further includes a bottom 15, vertical sides 16, and a circularly curved rear end 17. The box 7 has a top 18, which curves upwardly toward the rear end of the casing 6, Figure 2. The top 18 is provided at its rear end with a vertical flange 19, rigidly secured to the cylindrically curved wall of a vertical cylindrical hopper 20. The rear side of the hopper 20 extends below the top 18 and forms a rear circularly curved end 21 for the box 7. The hopper 20 extends vertically above the box 7 for a substantial distance and is open at its top end. The forward side of the hopper 20 has a large opening 22, the top edge 23 of which is curved as shown in Figure 1.

The sides 9 of box 7 have parts extending vertically upwardly to form vertical panels or sides 24. These sides 24 extend near the top of the hopper 20 and are tangent to the same, Figure 3. The sides 24 are preferably rigidly connected to the hopper 20. The sides 24 have aligned vertical slots 25 formed therein, and these slots extend from the top 18 to near the tops of the sides 24. The slots 25 have top lateral extensions or slots 26, at right angles to the slots 25.

Disposed between the sides 24 extending laterally for substantially the full distance between the sides is a vertical slicing blade 27. The blade 27 is beveled and sharpened at its bottom edge and is pointed, as in Figure 1. The blade may be provided with an opening 28. The blade 27 is rigidly attached to a cross bar 29, the opposite ends of which slidably engage in the slots 25. The cross bar 29 has a knob or handle 30 at its center to facilitate raising and lowering the blade 27.

Adjacent to the slots 25, the top 18 has a spherical depression or seat 31, having a transverse elongated slot 32 therein.

In use, citrus fruit, such as oranges, are placed in the hopper 20. This hopper can be made any desired height and diameter to accommodate the desired quantity and size of fruit. The oranges in the hopper 20 will feed downwardly by gravity, and each orange can pass through the opening 22. The oranges roll upon the upwardly curved rear portion of the top 18, and the lowermost orange is seated within the depression 31. The orange within the depression cannot roll, and prevents the downward movement of the other oranges above it, until it has been sliced into halves.

With an orange, or the like, seated in the depression 31, as shown in Figure 2, the blade 27 is moved downwardly from the position shown in Figure 2 and will slice the orange in to halves. The blade 27 passes through the orange and into the slot 32. The blade 27 is then returned to its upper inoperative position. The juice drippings caused by slicing pass through the slot 32 and into the pan 12, which is readily removed from the box 7 for cleaning. When the sliced orange is removed, the next orange above will enter the depression 31. The slicer may be operated with one hand, and is very easy to clean. The casing 6 may be made of any suitable material, such as plastics.

It is to be understood that the form of my invention, herewith shown and described is to be taken as a preferred example of the same, and that various changes in the shape, sizes and arrangement of parts may be resorted to, without departing from the spirit of the invention, or the scope of the subjoined claims.

Having thus described the invention, I claim:

1. A combined unitary citrus fruit slicer and storage receptacle, comprising a relatively narrow elongated box forming a base and including a top having a depression and a slot extending transversely through the depression, a removable tray slidably mounted within the box beneath the top thereof and constructed and arranged to catch juice drippings from the slot, an upstanding storage hopper mounted upon the box at the rear end thereof and being of substantially the same width as the box and having a fruit discharge opening at its forward side and adjacent to the top of the box, upstanding spaced wide flat sides secured to the top of the box adjacent to its side edges and connected to the hopper, the upstanding sides and hopper forming with the top of the box a fruit slicing chamber having its forward side open, the upstanding sides having oppositely disposed vertical slots adjacent to the transverse slot, and a vertically moveable slicing blade disposed between the upstanding sides and having parts to engage in the vertical slots to be guided thereby, the blade entering the transverse slot when in the lower position for serving the fruit.

2. A combined unitary citrus fruit slicer and storage receptacle, comprising a relatively narrow elongated box forming a base and including a generally horizontal top including a rear inclined portion, the top having a depression and a transverse slot extending across the depression, a removable tray slidably mounted within the box beneath the top thereof and constructed and arranged to catch juice drippings from the transverse slot, an upstanding storage hopper mounted upon the box at the rear end thereof and above the inclined portion and being of substantially the same width as the box and having a fruit discharge opening at its forward side and adjacent to the top of the box, upstanding spaced wide flat sides secured to the top of the box adjacent to its side edges and connected to the hopper, the upstanding sides and hopper forming with the top of the box a fruit slicing chamber having its forward side open, the upstanding sides having aligned vertical slots and short horizontal slots leading into the tops of the vertical slots, and a vertically moveable slicer blade disposed between the upstanding sides and including a cross-bar to engage in the vertical slots and short horizontal slots, the blade entering the transverse slot when in the lowered position for severing the fruit.

ADOLPH O. GOLDSTEIN.

REFERENCES CITED

The following references are of record in the file of this patent:

UNITED STATES PATENTS

| Number | Name | Date |
|---|---|---|
| 364,641 | Gathman | June 14, 1887 |
| 1,921,633 | Nelson | Aug. 8, 1933 |
| 1,943,113 | Daum | Jan. 9, 1934 |
| 2,313,318 | Brown et al. | Mar. 9, 1943 |
| 2,373,584 | Malicay | Apr. 10, 1945 |